L. A. ASPINWALL.
Potato-Digger.

No. 50,889. Patented Nov. 14, 1865

WITNESSES:

INVENTOR:
L. Augt. Aspinwall

UNITED STATES PATENT OFFICE.

L. AUGUSTUS ASPINWALL, OF WATERVLIET, NEW YORK.

IMPROVEMENT IN POTATO-DIGGERS.

Specification forming part of Letters Patent No. 50,889, dated November 14, 1865.

*To all whom it may concern:*

Be it known that I, L. AUGUSTUS ASPINWALL, of the town of Watervliet, Albany county, State of New York, have invented a Machine for Digging Potatoes; and I declare the following specification, with the drawings, forming part thereof, to be a full and complete description of my invention.

Figure 1:
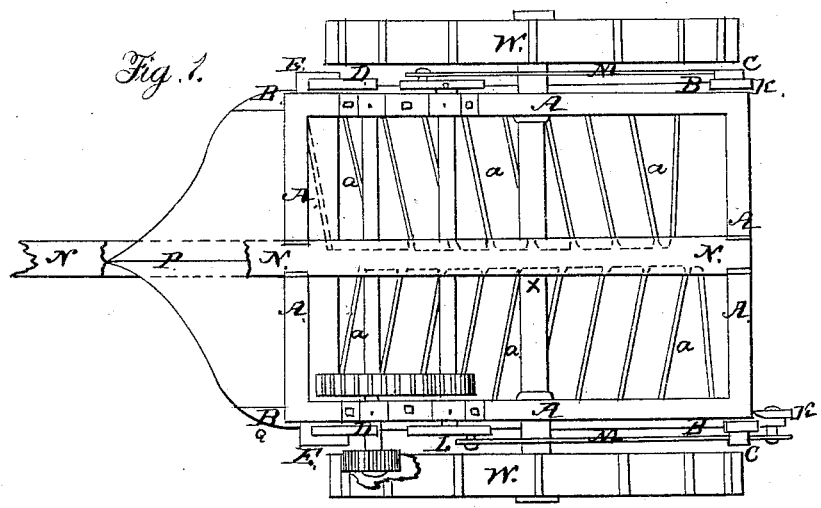
Figure 2:
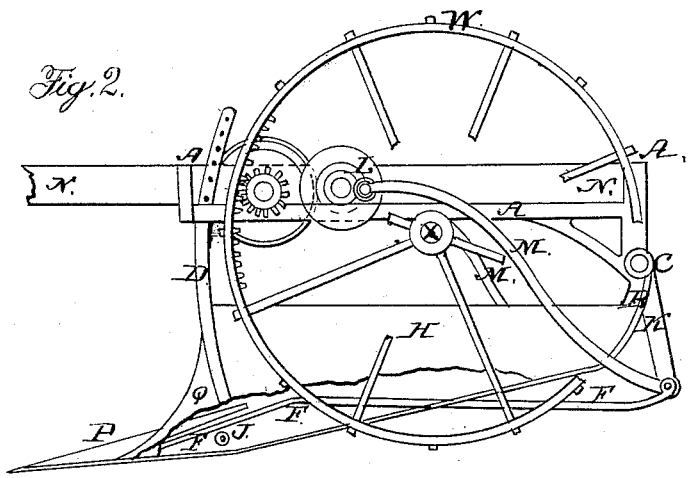
Figure 3:
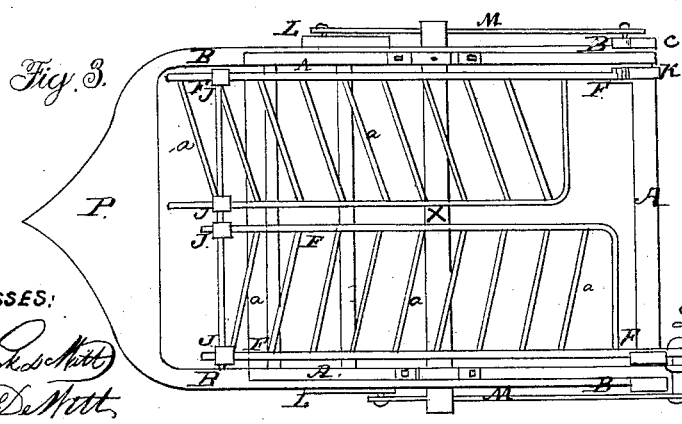

Figure 1 is a plan or bird's-eye view of the machine. Fig. 2 is a profile view of the same. Fig. 3 is a reverse plan, as the machine would be seen from underneath.

Similar letters denote the same parts of the apparatus.

A is the frame of the machine, supported by the wheels W.

P is a plow, extending across the width of the frame A and projecting in front of it. It is a scoop, with a plow-point, as shown, suspended from the frame by two arms, B, which extend backward below the frame and are pivoted at C to its side rear bars. The front ends of these arms are supported by two standards, D, attached to the mold-boards Q, and pass through loops E on the outer side of the frame near its front. By these standards the plow can be raised or lowered to or from the frame, and held in place by pins inserted in holes, shown in their upper parts.

Forming part of the plow, for the purpose of cutting the outer sides of the earth-hills, there are mold-boards Q, formed as shown in the drawings, extending back to the rear edge of the bottom of the plow, or beyond it. These mold-boards have their inner sides parallel with each other, or a little wider in rear than in front, so as to make an easy passage for the material thrown between them by the plow, and their outer sides flare outward, so as to throw off the soil from the hill, away from the sides of the machine.

From the mold-boards to the rear of the arms B low side walls, H, Fig. 2, are attached, so as to prevent the material raised by the plow and passing backward from scattering sidewise. Between these walls are a pair of frames or screens, F, being parallel side bars, with cross-bars placed obliquely, as shown in the drawings, with proper intervals between them to pass the earth brought upon them by the plow.

The front ends of the side bars are supported by rollers, J, Figs. 2 and 3, lying under the plow, and their back ends by hangers K, on which they can be swung backward and forward, the hangers being pivoted at C in the line of the axis of the plow-frame, so that when the plow is raised or lowered the screens may preserve their relative position and harmonious action. They (the hangers) extend downward so far as to give a backward slope to the screens when the machine is operating.

The front ends of the screens, which pass over the rollers J, are bent downward, as shown in Fig. 2, for the purpose of producing an elevation of their front ends as the frames swing backward. The front ends and the rollers lie under the plow, so that whatever is forced backward by the action of the plow may lodge upon the screens. The screens are vibrated or shaken by the cranks L, which are moved by gearing connecting them with one of the wheels W, in the manner shown or any other convenient mode, the cranks being connected with the hangers K by rods M. The cranks are so set as to give an alternating movement to the screens. Instead of a pair of screens a a single vibrating screen may be used.

N is the pole for the draft of the machine.

The operation of the machine is thus: The plow, having been gaged for its work by the standards D, passes under the hills and forces the potatoes, with the earth, vines, and weeds, back upon the screens, which by their rapid vibrations shake out and drop through their bars all the soil, leaving the potatoes clean of earth and passing them, with the vines and weeds, to the rear, dropping them in the track of the machine.

It will be noticed that the screens have not only a swinging motion back and forth, but that as their rear ends rise by the movement of the hangers K the front ends rise also as they slide over the rollers J, producing, in concert with the swinging movement, a rapid passage of the load to the rear of the machine.

What I claim as my invention, and desire to secure by Letters Patent, are the following devices, substantially as described, and for the purposes set forth in this specification:

A vibrating screen or screens suspended in the rear by hangers from the same line of axis as the plow-arms, and in front upon rollers under the plow, the front ends of the side bars, which traverse the rollers, being so formed as to give them an upward lifting movement as the screens move from the front to the rear, the screens, when two are used, vibrating alternately with each other.

L. AUGS. ASPINWALL.

Witnesses:
RICHD. VARICK DE WITT,
A. V. DE WITT.